July 7, 1925.
L. ROYAK
EYEGLASSES
Filed Aug. 25, 1924
1,545,281
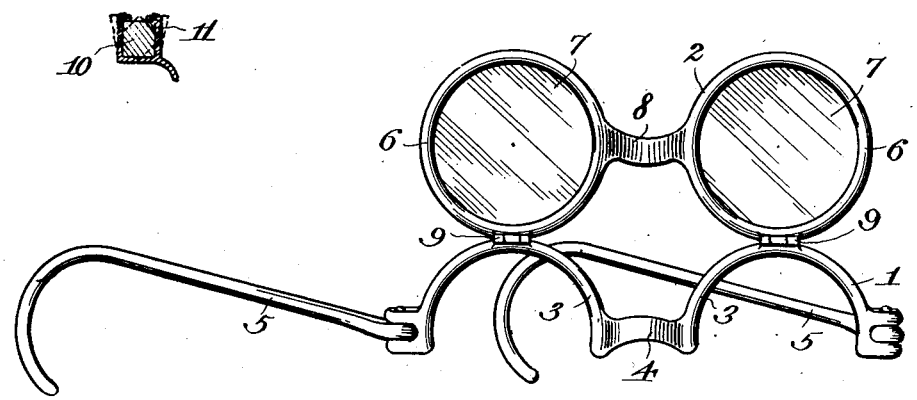
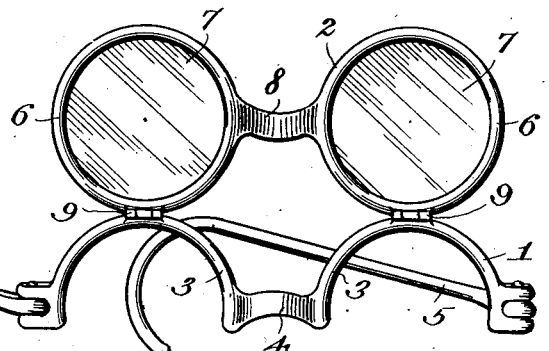
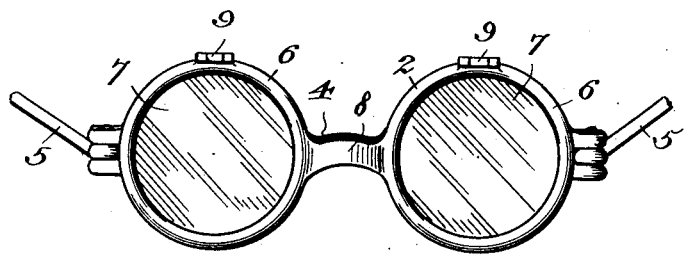
WITNESSES:
INVENTOR,
Louis Royak
BY
ATTORNEYS.

Patented July 7, 1925.

1,545,281

UNITED STATES PATENT OFFICE.

LOUIS ROYAK, OF NEW YORK, N. Y.

EYEGLASSES.

Application filed August 25, 1924. Serial No. 734,080.

*To all whom it may concern:*

Be it known that I, LOUIS ROYAK, a citizen of Hungary, and a resident of the city of New York, borough of Manhattan, in the county and State of New York, have invented new and useful Improvements in Eyeglasses, of which the following is a full, clear, and exact description.

This invention relates to eyeglasses and more particularly to eyeglasses of the spectacle type, an object of the invention being to provide a frame to which the lenses or their mounting are hingedly or movably connected so that they may be properly positioned relative to the frame for use or they may be swung to a position above the frame out of the line of vision.

Many wearers of eyeglasses need the lenses only at certain times, and it is necessary or desirable to lay the glasses aside or to elevate them and support them on the forehead or head. This is particularly true where glasses are needed only for close work and are then either elevated or removed altogether.

It is the primary object of my invention to provide eyeglasses in which the lens carrying portions may be positioned in front of the eyes or located in a position above the eyes or moved to any intermediate position, and the advantages of such a structure are manifold; for example, glasses of this kind may be conveniently worn by chauffeurs, drivers and others so that the glasses may be either positioned in front of the eyes or elevated. Furthermore, such a construction enables the wearer to elevate the lenses to wipe the eyes, to remove dust and the like, and then lower the lenses into operative position without unduly soiling them.

With these and other objects in view, the invention consists in certain novel features of construction and combinations and arrangements of parts which will be more fully hereinafter described and pointed out in the claim.

In the accompanying drawings—

Figure 1 is a perspective view of my improved eyeglasses showing the lenses in elevated position;

Figure 2 is a view in front elevation showing the lenses in normal position;

Figure 3 is a top plan or edge view of Figure 2;

Figure 4 is a fragmentary exaggerated view in section on the line 4—4 of Figure 3.

1 represents the frame of my improved eyeglasses and 2 the lens carrier. The frame 1 comprises a pair of arched members 3, 3 connected at their inner ends by a nose or bridge piece 4. The outer ends of the members 3, 3 are provided with movable or hingedly connected temples or bows 5 which may be of any desired form. The parts above described may be of tortoise shell, celluloid, metal or any other suitable material although, of course, lightness and strength must be provided for.

The lens carrier 2 comprises a pair of rings 6, 6 adapted to support lenses 7, and these rings 6 are connected by a bridge piece 8 which conforms in shape to the bridge piece 4 and is adapted to fit thereover when the parts are in normal position. Furthermore, the rings 6 are curved concentrically with the arched frame members 3 so that they lie parallel therewith and cover the frame members when in normal position.

The lens carrier 2 is connected to the frame members 3 by hinges 9 so that the lens carrier may be swung to a position above the frame, as indicated in Figure 1, or may be swung to a position in front of the frame, as indicate in Figure 2. As it is desirable to prevent accidental movement of the lens carrier relative to the frame I have devised a construction of hinge in which the pintle 10 is angular in cross section and engages an angular split sleeve 11 on one of the hinge members, so that when the pintle is turned it will offer some resistance and the split sleeve will function as a spring to hold the lens carrier in either of its ordinary positions.

The broad idea of my invention is therefore to provide a lens carrier which can be moved relatively to the spectacle frame so that the lenses may be located in normal position relative to the frame or may be swung to a position on top of the frame or above the frame and be out of the line of vision.

Various slight changes and alterations might be made in the general form of the parts described, without departing from my invention, and hence I do not limit myself to the precise details set forth but consider myself at liberty to make such slight changes and alterations as fairly fall within the spirit and scope of the appended claim.

I claim:

The combination with a frame, comprising a pair of arched members and a bridge piece connecting them, of a lens carrier comprising a pair of lens holding rings with a bridge piece connecting them, said bridge piece adapted to fit against the outer face of the first-mentioned bridge piece, and hinges connecting the rings with the upper portions of the arched members, said hinges having angular pintles and one of the sleeve members of each hinge constituting an angular split clamp.

LOUIS ROYAK.